(12) United States Patent
Pauplis

(10) Patent No.: US 7,199,753 B2
(45) Date of Patent: Apr. 3, 2007

(54) CALIBRATION METHOD FOR RECEIVE ONLY PHASED ARRAY RADAR ANTENNA

(75) Inventor: Barbara E. Pauplis, Carlisle, MA (US)

(73) Assignee: Raytheon Company, Waltham, MA (US)

(*) Notice: Subject to any disclaimer, the term of this patent is extended or adjusted under 35 U.S.C. 154(b) by 107 days.

(21) Appl. No.: 11/154,397

(22) Filed: Jun. 16, 2005

(65) Prior Publication Data

US 2006/0284768 A1   Dec. 21, 2006

(51) Int. Cl.
*G01S 7/40* (2006.01)
(52) U.S. Cl. .................. 342/368; 342/174; 342/361
(58) Field of Classification Search ............. 342/165, 342/173, 174, 361, 368, 473
See application file for complete search history.

(56) References Cited

U.S. PATENT DOCUMENTS

| 5,477,229 | A | * | 12/1995 | Caille et al. ............. 342/360 |
| 5,822,429 | A | * | 10/1998 | Casabona et al. ........ 380/252 |
| 5,861,843 | A |   | 1/1999 | Sorace et al. |
| 6,686,873 | B2 |  | 2/2004 | Patel et al. |
| 6,720,919 | B1 |  | 4/2004 | Sinsky et al. |
| 6,771,216 | B2 |  | 8/2004 | Patel et al. |
| 2006/0087475 | A1 | * | 4/2006 | Struckman ............... 342/451 |

* cited by examiner

*Primary Examiner*—Dao Phan
(74) *Attorney, Agent, or Firm*—John H. Pearson, Jr., Esq.; Walter F. Dawson, Esq.; Pearson & Pearson, LLP

(57) ABSTRACT

A method of calibrating a receive only, phased array antenna in its operating environment. Two transmit signals of different but unknown polarizations are used to calibrate the receive only antenna array, and the receive element locations and polarizations are accurately known. The method determines the complex weights on the antenna elements and the magnitude of the vertical and horizontal components of the calibration signal in the presence of multi-path signals as well as standard noise. Two different methods for calibrating are provided. A first method uses combinations of three elements to determine the calibration constants using small matrices and then averaging all the possible results for each element, and a second method solves for the calibration constants for all elements at one time using a singular value decomposition, but requires the manipulation of large, sparse matrices.

8 Claims, 6 Drawing Sheets

CALIBRATION METHOD FOR RECEIVE ONLY PHASED ARRAY RADAR ANTENNA

BACKGROUND OF THE INVENTION

1. Field of the Invention

This invention relates generally to calibration of a phased array antenna, and in particular to a method of determining calibration constants for calibrating a receive only phased array antenna.

2. Description of Related Art

A phased array radar requires a high quality antenna array calibration to achieve high accuracies for multiple target tracking and interception guidance. Calibration is typically performed in a Near Field Range (NFR) and then periodically verified with an external RF source. However, the NFR calibration works fine when the antenna array is physically small enough so that it can be placed in the range. If the antenna array is too large, use of NFR is not possible. Also, using an external source is not always practical depending where the radar is located.

Previous calibration methods include a random number of elements with known locations and orientations, and the polarization for the calibration signal is known or assumed. Also, it was assumed that the noise and multi-path would normalize to zero which could lead to a calibration bias if either one is correlated.

Often a large array is located in both noisy and multipath environments. It is desirable to perform calibration independent of receive array polarization and tolerant of failed receive elements.

Previous methods of phased array antenna calibration are described in the following patents:

U.S. Pat. No. 5,861,843 issued Jan. 19, 1999 to Ronald E. Sorace and assigned to Hughes Electronics Corp. of El Segundo, Calif. discloses an orthogonal phase sequence method of calibrating a phased array antenna whereby the phase of each element signal is sequentially switched once at a time through four orthogonal phase states. At each orthogonal phase state, the power of the array antenna signal is measured. A phase and an amplitude error for each of the element signals is determined based on the power of the array antenna signal at each of the four orthogonal phase states. The phase and amplitude of each of the element signals is then adjusted by the corresponding phase and amplitude errors. However, the calibration measurements must be made at precisely these four orthogonal angles and multiple transmit signals are sent out for each element resulting in sequential calibration.

U.S. Pat. No. 6,720,910 issued Apr. 13, 2004 to Jeffrey H. Sinsky, et al. and assigned to Lucent Technologies, Inc. discloses a phased array calibration using sparse arbitrarily spaced rotating electric vectors and a scale measurement system. Data points are generated by measuring the power of the transmitted/received signal while each antenna element is rotated through a series of phase angles. Thereafter, a pairwise comparison of the data points is performed in order to determine the phase and amplitude corrections needed for each antenna element. This pairwise analysis uses as few as three signal measurements for each antenna element, made at sparse, arbitrarily spaced phase angles. Further, the method includes smart data selection to ignore bad data points resulting from anomalies or noise bursts. However, this calibration method is for a transmit array, and requires four orthogonal calibration electric fields which are known and accurate. Pair-wise analysis uses at least three calibration signals for each element.

U.S. Pat. No. 5,477,229 issued Dec. 19, 1995 to Gérard Caille, et al. and assigned to Alcatel Espace of Courbevoie, France discloses a method of calibrating an active antenna which may receive or transmit. In the case of a receive antenna the signal on each radiating source is amplified and phase-shifted in a variable gain active module applying a variable phase-shift. The N amplified signals on the N channels are then combined by a power combiner and transferred over a single channel to a centralized receiver. However, this method of calibrating is performed in a near-field range with a near-field probe.

SUMMARY OF THE INVENTION

Accordingly, it is therefore an object of this invention to provide a method of calibrating a receive only, phased array antenna in its operating environment.

It is another object of this invention to provide a calibration method for a receive only, phased array antenna where the unknowns are the complex weights on the antenna elements and the magnitude of the vertical and horizontal components of the calibration signals, which can be determined in the presence of multipath signals as well as standard noise.

It is a further object of this invention to provide a calibration method for a phased array antenna using two transmit calibration signals of different unknown polarizations from the same location or different locations.

It is another object of this invention to provide a calibration method for a receive only, phased array antenna using combinations of three antenna elements to determine calibration constants using small matrices, and then averaging all the possible results for each element.

It is yet another object of this invention to provide a calibration method for a receive only, phased array antenna which solves for the calibration constants for all antenna elements at one time using a singular decomposition resulting in the manipulation of large sparse matrices.

These and other objects are further accomplished by a method for determining calibration constants for calibrating a receive only phased array antenna comprising the steps of providing a pair of transmit signals with unknown polarization, identifying known parameters including a location ($\vec{x}_n$) of an antenna element (n) of the phased array antenna, an orientation $\Delta \vec{x}_n$ of the antenna element (n), polarization of element (n) relative to the orientations of element (n), and a location of a transmitter $\vec{x}^1$, identifying unknown parameters including weights ($w_n$) of the elements (n), and vertical magnitude ($E_V$) and horizontal magnitude ($E_H$) of each of the transmit signals, determining a receive signal at each of the antenna elements based on the transmit signals, defining six simultaneous equations with seven unknowns using one antenna element as a standard (p), a second antenna element (m, where m≠p) and a third antenna element (n, where n≠p and n≠m), solving the six simultaneous equations for weights for every possible set of three antenna elements to find a vector of calibration weight (w) for each antenna element, and averaging the calibration weights (w) for each antenna element. The method comprises the steps of determining a standard deviation on the calibration weights (w) for each antenna element, removing outlier weights, and reaveraging the calibration weights (w) for each antenna element. The method comprises the steps of reducing an original set of antenna elements to a reduced set of unsolved elements and repeating the method.

The objects are further accomplished by a method for determining calibration constants for calibrating a receive only phased array antenna comprising the steps of providing a pair of transmit signals with unknown polarization, selecting antenna element "p" and setting weight $w_p=1$, determining full matrix equation (A) of size $NP \times 2P+N$ using all antenna elements and the pair of transmit signals with unknown polarization, performing a singular value decomposition on said matrix equation (A), wherein $A=U*S*V^T$, multiplying matrix equation (A) by $U^{-1}$ and solving resulting equation for B=0 according to the relationship $U^{-1}USV^Tw=U^{-1}$ B or $SV^Tw=0$ truncating matrix S to a square matrix of $(2P+N \times 2P+N)$, multiplying S and $V^T$ to yield a square matrix $\Psi$ and $\Psi_w=0$, reducing the square matrix $\Psi$ order by 1 by setting a last unknown, $W_{(2P+N)}=1$, wherein the equation becomes $\Xi w=C$, performing a matrix inversion to solve for reduced matrix and the set of unknown complex weights and a steering vector, wherein $w=\Xi^{-1}$ C and $w=(w_1, w_2, \ldots w_{2P+N-1}, 1)$, and repeating the above steps until the calibration constants of all antenna elements are resolved.

These and other objects are further accomplished by an apparatus comprising a first transmitter and a second transmitter, each of the first transmitter and the second transmitter transmitting signals of different polarizations, a receive only phased array antenna system having a phased array antenna with linearly polarized antenna elements for receiving the transmitted signals of different polarizations from the first transmitter and the second transmitter, and a processor coupled to outputs of the antenna elements for determining calibration constants for each of the antenna elements of the phased array antenna for calibrating the phased array antenna.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
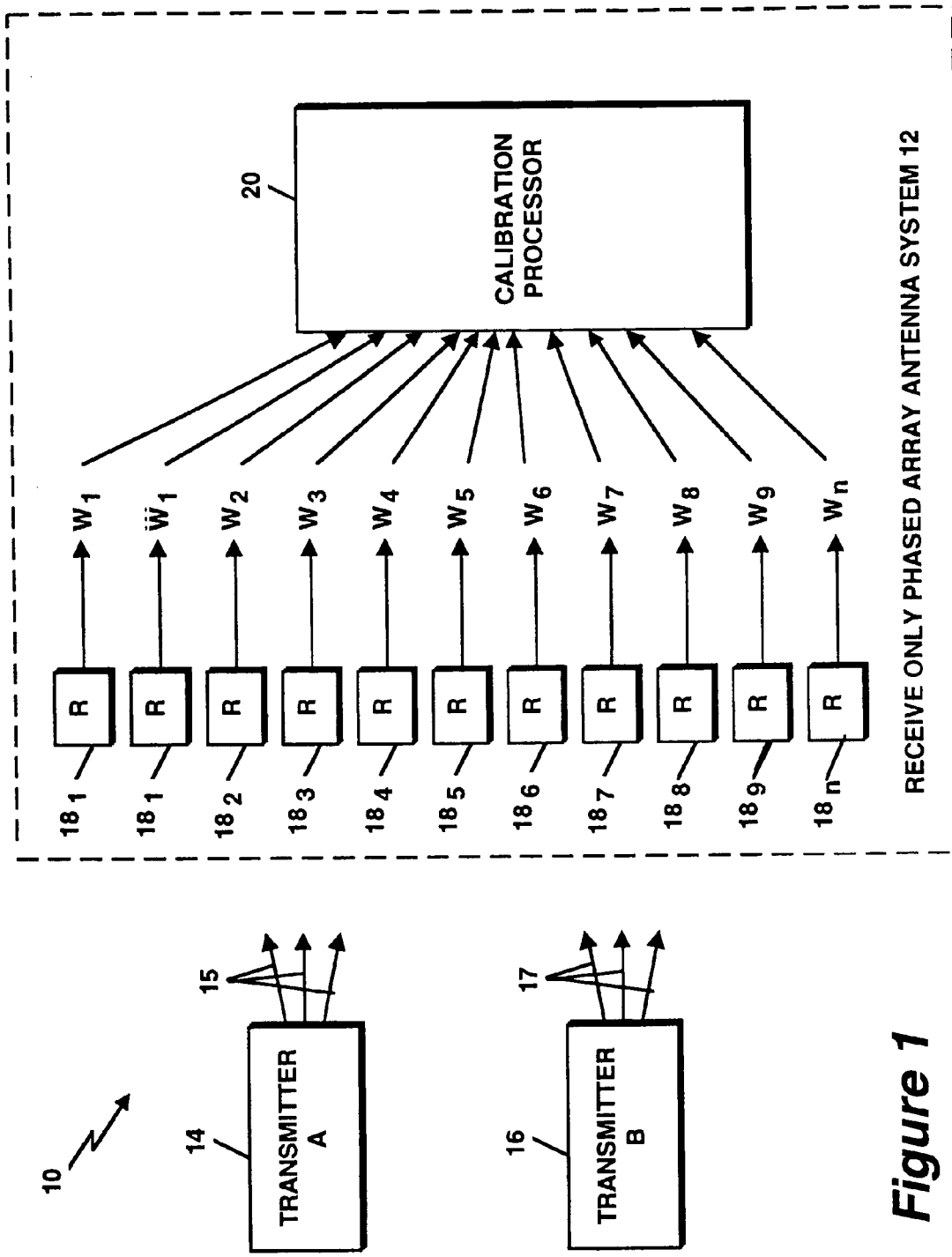
FIG. 1 is a block diagram illustrating the calibration of a receive only phased array antenna system having a calibration processor for performing the calibration of the antenna according to the present invention.

Referring to FIG. 1, a block diagram of a calibration method of a receive only phased array antenna system 10 is shown comprising a phased array antenna 12 having a plurality of antenna elements $18_1$–$18_n$ arranged in an array of elements which need not be in a regular grid, need not be aligned in parallel and need not be planar. The antenna elements $18_1$–$18_n$ accept only linear polarization with the polarization known in relation to the physical direction of the element. FIG. 1 depicts the calibration set-up. Two transmitters 14, 16 generate two transmit signals 15, 17 of different polarizations. The transmitters 14, 16 can be in one or different known physical locations. The receive array antenna 12 comprises linearly polarized elements which may be laid out in any manner in space (three dimensional) and the element positions and orientations are relatively well known. Each element $18_1$–$18_n$ has its own receiver. The results are fed into a computer or processor 20, with known data such as the speed of light in air, the locations and orientations of the elements, and the transmitter location(s). A complex weight may be applied to the output $W_1$–$W_n$ of each receiver so as to create coherent summation from all elements for an incoming signal from a known direction. These would be the calibration constants summed with a steering vector. Because the steering vector is known, when the weights are solved for, the calibration constants can be determined.

Two calibration signals 15, 17 are transmitted from transmitter A 14, and transmitter B 16 in a known location (to the accuracy of a GPS). The two calibration signals 15, 17 have different but unknown polarizations in order to calibrate the phased array antenna 12. The two calibration signals 15, 17 can be from the same location or different locations.

This calibration method uses the two transmit calibration signals 15, 17 of different unknown polarization to calibrate the active receive antenna 12 in the location in which the antenna is used, whereby the calibrating method is very useful for a very long range radar. The noise is unknown and the individual antenna elements can initially be set up with random weights. The software which performs the calibration method operates in the calibration processor 20. This calibration method allows for different polarization calibration signals to decouple the noise and multi-path signals, and allows for different source location to further decouple the noise and multi-path signals.

Figure 2:
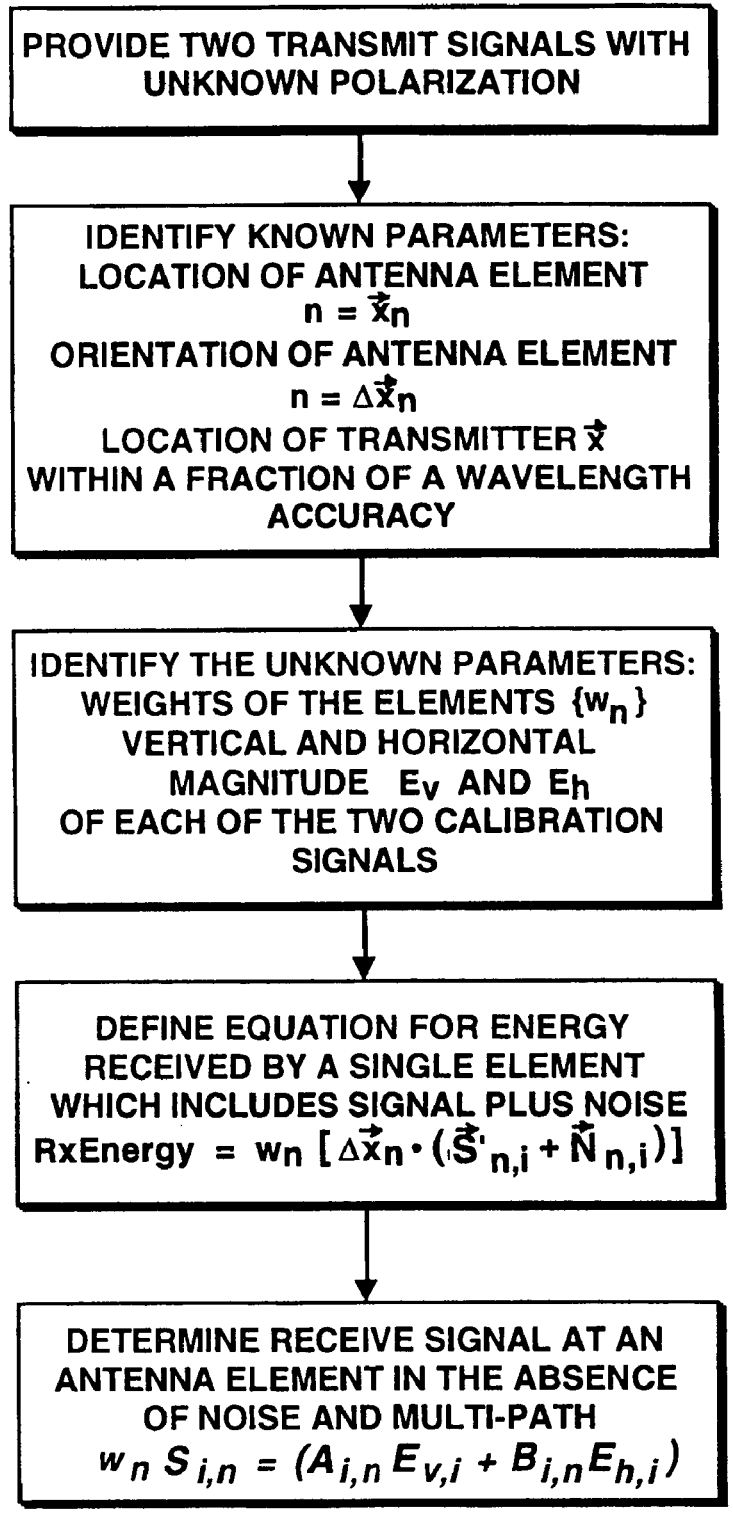
FIG. 2 is a flow chart summarizing how data is acquired and modeled for a calibration method for a receive only phased array antenna according to the present invention.

Referring now to FIG. 2, a flow chart shows how data is acquired and modeled for calibrating a receive only, phased array antenna 12 having a plurality of elements $18_1$–$18_n$. The antenna elements $18_1$–$18_n$ receive signals from transmitters 14, 16. Each of the antenna elements $18_1$–$18_n$ generate a signal $W_1$–$W_n$ with a phase and an amplitude. Calibration constants are required so that energy received from a known direction will add coherently. If the calibration constants are known, then additional steering terms can be added to steer the beam and it will remain coherent in the direction of interest.

The calibration problem for the phased array radar antenna 12 is a problem where the complex weights on the antenna elements and the magnitude of the vertical and horizontal components of the calibration signal are the unknowns. This leads to N+2P unknowns where N is the number of elements and P is the number of calibration signals. Like most calibration schemes, it is assumed that a decorrelated noise signal averages to zero. It is a requirement of this calibration method to have more than one transmit signal of different polarizations in order to decouple the multipath so that the calibration can be done in the field. Therefore, step 50 states to provide two transmit signals 15, 17 with unknown polarization. When two transmit signals 15, 17 with different polarizations and three individual elements are used, then the calibration can be done relative to a single element, which is all that is required.

The following knowns are identified in step 52: $\vec{x}_n = (x_n, y_n, z_n)$ is the location of antenna element n. $\Delta \vec{x}_n = (\Delta x_n, \Delta y_n, \Delta z_n)$ is the orientation of antenna element n. $\vec{x}' = (x' \ y' \ z')$ is the location of the transmitter. The following unknowns are identified in step 54: $\{w_n\}$ the weights on the antenna elements, and $E_v$ and $E_h$, the vertical and horizontal magnitudes of the calibration signal(s).

Then, using this notation, the energy received by a single antenna element as shown in step 56 is:

$$RxEnergy = w_n[\Delta \vec{x}_n \cdot (\vec{S}'_{n,i} + \vec{N}_{n,i})]$$

where $\vec{S}'_{n,i}$ is the transmitted calibration signal from source i to the location of element n, and $\vec{N}_{n,i}$ is the noise. Using a plane wave propagation vector for the transmit signal, the received energy becomes:

$$RxEnergy = w_n \Delta \vec{x}_n \cdot \left( \vec{S}_i \frac{e^{-j\vec{k} \cdot (\vec{r}_n - \vec{r}'_i)}}{|\vec{r}_n - \vec{r}'_i|} + \vec{N}_{n,i} \right)$$

If $\xi_n$ is the energy received at element n, which is the signal plus the noise, then the optimum weights for the elements would be when:

$$\sum_{i=1}^{M} \left[ w_n \xi_{n,i} - \Delta \vec{x}_n \cdot \vec{S}_i \frac{e^{-j\vec{k} \cdot (\vec{r}_n - \vec{r}'_i)}}{|\vec{r}_n - \vec{r}'_i|} \right]^2 = \min$$

where M is the total number of calibration signals. Then define $\vec{S}_i = E_{v,i} \hat{e}_v + E_{h,i} \hat{e}_h$ where $\hat{e}_v$ is the unit vector vertical direction and $\hat{e}_h$ is the unit vector in the horizontal direction, $E_{v,i}$ is the magnitude of the transmitted vertically polarized electric field, and $E_{h,i}$ is the magnitude of the transmitted horizontally polarized electric field.

If the polarization of the transmit signals is known, then by using many calibration signals from a single source location, the least mean square (LMS) solution for the weights is:

$$w_n = \frac{e^{-j\vec{k} \cdot (\vec{r}_n - \vec{r}'_i)}}{|\vec{r}_n - \vec{r}'_i|} (\xi_n^T \xi_n)^{-1} \xi_n^T [E_{v,i} \ E_{h,i}] \begin{bmatrix} \Delta \vec{x}_n \cdot \hat{e}_v \\ \Delta \vec{x}_n \cdot \hat{e}_h \end{bmatrix}$$

Note: for multiple source locations, the propagation component would have to be included into the matrix elements as in the next paragraph.

For the case where the transmit signal polarization of each calibration signal is unknown and allowing the location of the different calibration signals to vary, it becomes helpful to define:

$$A_{i,n} \equiv \frac{e^{-jkr_{i,n}}}{r_{i,n}} [\Delta \vec{x}_n \cdot \hat{e}_v]$$

$$B_{i,n} \equiv \frac{e^{-jkr_{i,n}}}{r_{i,n}} [\Delta \vec{x}_n \cdot \hat{e}_h]$$

where $r_{i,n} \equiv |\vec{r}_n - \vec{r}'_i|$.

Then, in the absence of noise and multipath, the receive signal at an element as shown in step 58 becomes:

$$w_n S_{i,n} = (A_{i,n} E_{v,i} + B_{i,n} E_{h,i})$$

For a first iteration, the received signal will approximate the ideal signal, since there is no clean signal available.

Figure 3:
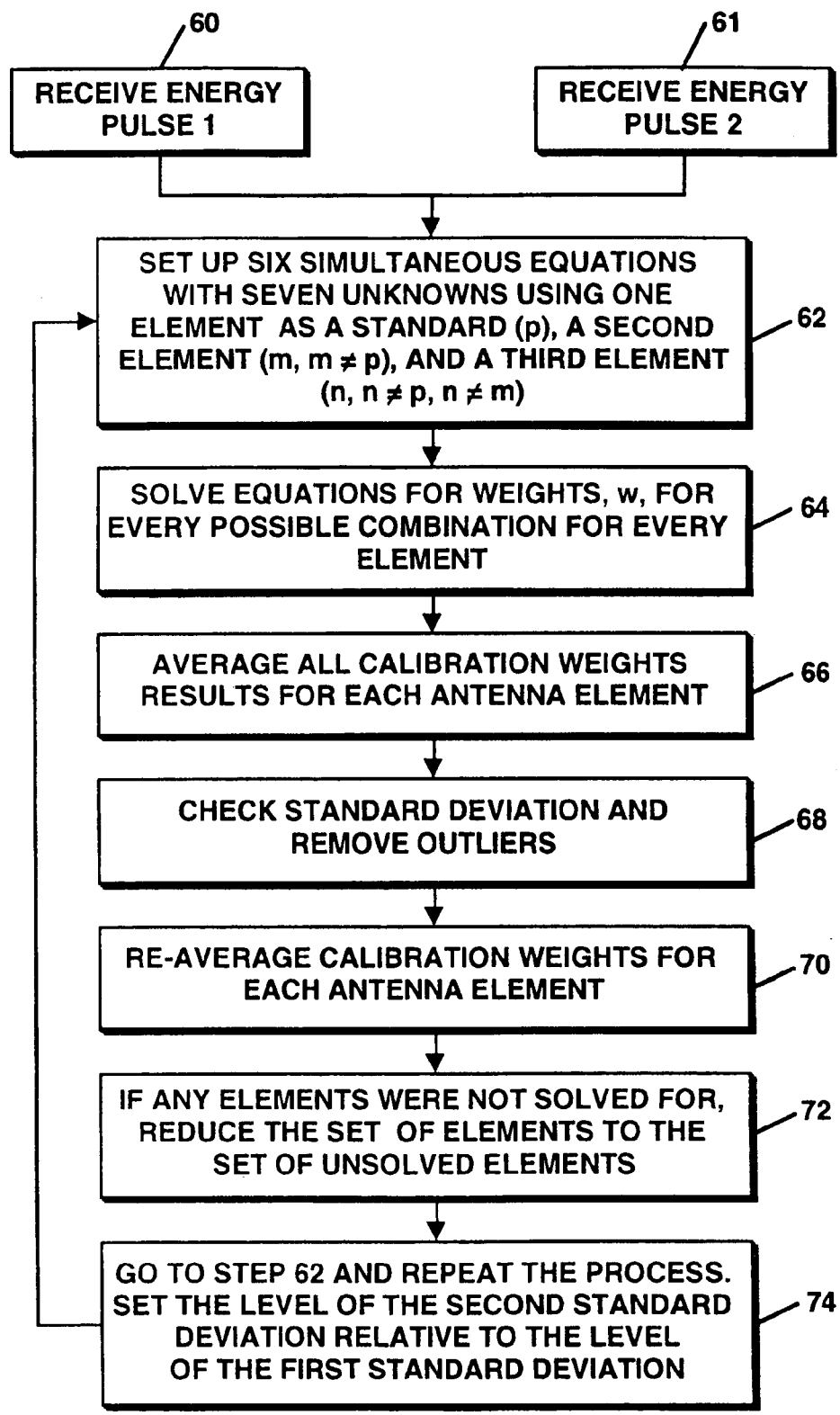
FIG. 3 is a flow chart of a first method for determining calibration constants using combinations of three elements of a receive only phased array antenna according to the present invention.

Referring to FIG. 3, a first method for determining a non-trivial solution of the calibration constants is provided which determines the number of calibration pulses and the number of elements to use in order to achieve the non-trivial solution. Once this is done, it never needs to be done again. Only the results are used i.e. 3 elements and 2 transmit signals. This is determined using the below equations and it is not repeated. The following integer definitions are applied:

P=the number of calibration signals.

N=the number of elements.

U=the number of unknowns=2P+N. (The factor of 2 is from the polarization decomposition.)

E=the number of equations PN.

For the non-trivial solution, U−E=1. This means that each of the unknowns will be solved relative to a single unknown as follows:

$$P = 1 + 1/(N-2)$$

The only solution where P is an integer is when N=3 and P=2. Therefore, three elements must be calibrated at a time using two different calibration signals.

In step 60 and step 61 two calibration pulses are provided, PULSE 1 and PULSE 2. The above equations lead to a set of six simultaneous equations with seven unknowns, as indicated in step 62, comprising the vertically and horizontally radiated energy for each of the two calibration signals (four unknowns) and the calibration weights of the three elements (three unknown). For these equations, the received signal is used to approximate the ideal calibration signal. Then, in order to remove the random noise in the calibration, every possible set of three elements is used to find a vector of calibration weights for each element as indicated in step 64. The average value of this vector is obtained in step 66 and used as the calibration weight. A measure of the "goodness" of the weight can be found in the standard deviation of the vector for that element as indicated in step 68. Any outliers can be eliminated to remove "failed" elements, and the weight vector is re-averaged without the "failed" elements in step 70.

As previously stated, a requirement of this calibration method is that the two signals have different polarizations. The different polarizations, and possibly the different calibrations source locations, will help to de-couple the noise and multipath.

The equation to be solved, using three elements and two calibration signals, is as follows:

$$\begin{bmatrix} A_{i,n} & B_{i,n} & 0 & 0 & \xi_{n,i} & 0 & 0 \\ A_{i,m} & B_{i,m} & 0 & 0 & 0 & \xi_{m,i} & 0 \\ A_{i,p} & B_{i,p} & 0 & 0 & 0 & 0 & \xi_{p,i} \\ 0 & 0 & A_{j,n} & B_{j,n} & \xi_{j,n} & 0 & 0 \\ 0 & 0 & A_{j,m} & B_{j,m} & 0 & \xi_{m,j} & 0 \\ 0 & 0 & A_{j,p} & B_{j,p} & 0 & 0 & \xi_{p,j} \end{bmatrix} \begin{bmatrix} E_{v,i} \\ E_{h,i} \\ E_{v,j} \\ E_{h,j} \\ w_n \\ w_m \\ w_p \end{bmatrix} = \begin{bmatrix} 0 \\ 0 \\ 0 \\ 0 \\ 0 \\ 0 \\ 0 \end{bmatrix}$$

with the minus sign incorporated into the received field. The {i, j} refer to the transmit calibration signals being used for this particular calibration and {n, m, p} are the three elements which are being calibrated at this time.

If there are no special cases, (for example, an element perfectly lined up with either the horizontal or vertical unit vectors), two of the weights relative to a third, are found from the solution of the matrix equation above. This leads to the following terms in the weight calibration vector:

$$w_m = \frac{\alpha_i \left(\frac{A_{i,n}}{A_{i,p}}\right)\xi_{p,i} - \beta\alpha_j\left(\frac{A_{j,n}}{A_{j,p}}\right)\xi_{p,j}}{\left(\frac{A_{i,n}}{A_{i,p}}\right)\xi_{m,i} - \beta\left(\frac{A_{j,n}}{A_{j,m}}\right)\xi_{m,j}} w_p$$

$$w_n = \frac{\left(\frac{A_{i,n}}{A_{i,p}}\right)\xi_{m,i}w_m - \alpha_j\left(\frac{A_{i,n}}{A_{i,p}}\right)\xi_{p,i}w_p}{(1-\alpha_i)\xi_{n,i}}$$

for elements n and m, where $$\alpha_i = \frac{B_{i,n} - \left(\frac{A_{i,n}}{A_{i,m}}\right)B_{i,m}}{B_{i,n} - \left(\frac{A_{i,n}}{A_{i,p}}\right)B_{i,p}}$$

$$\beta = \frac{(1-\alpha_i)\xi_{n,i}}{(1-\alpha_j)\xi_{n,j}}$$

After all element permutations have been used, the final weight for a single element is determined as the average value of the weight vector for that element. A measure of the validity of this weight can be determined by the standard deviation of the weight vector.

Figure 4:
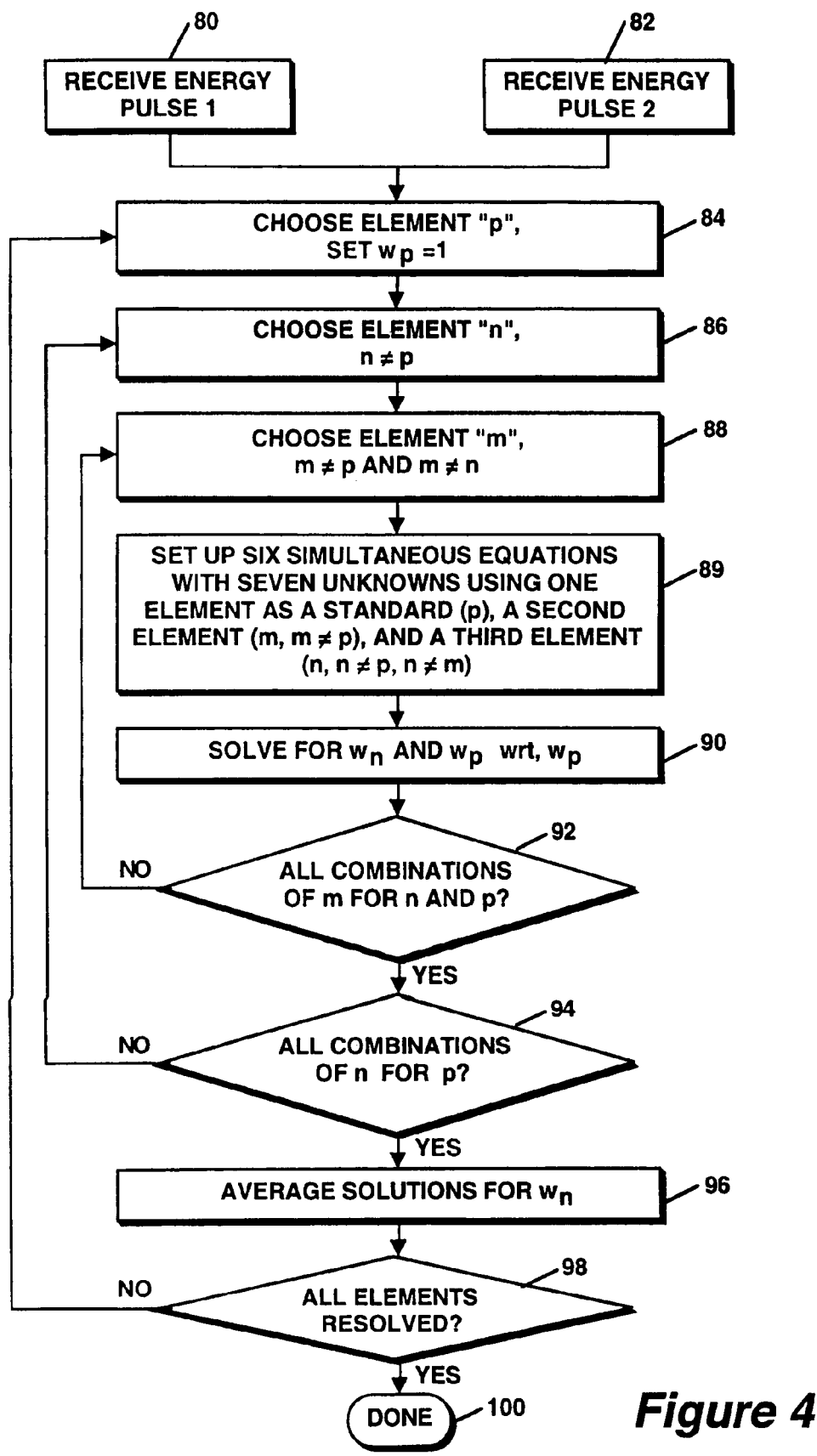
FIG. 4 is a detailed flow chart of the first method for determining calibration constants showing looping operations for determining weights for every possible combination of every antenna element.

Referring to FIG. 4, a detailed flow chart is shown in steps 80–100 of the first method shown in FIG. 3 for determining the calibration constant showing looping operations for determining the weights for every possible combination of every antenna element n. FIG. 4 shows that three antenna elements "p", "n" and "m" in steps 84, 86, 88 which are chosen for each calculation and all the loops over the different elements to obtain $w_n$.

In steps 89, six simultaneous equations with seven unknowns are set up using one element of a standard p, a second element (m, m≠p) and a third element (n, n≠p, n≠m). The above equations are solved in step 90 for $w_n$ and $w_p$ with respect to (wrt) $w_p$. In step 92 all combinations of m for n and p are checked, and if not completed, returns to step 88. In step 94 all combinations of n for p are checked and if not completed returns to step 86. In step 96 the average of all calibrations weights $w_n$ for each element is determined. In step 98, if all elements are not resolved, the program returns to step 84 and continues until all element weights are determined, and then proceeds to step 100.

Any elements for which a weight could not be determined using the first designated "pth" element, if any, are stored. A second pass can then be performed using a new "pth" element from the uncalibrated set of elements. It is only then required to set the weight of the second "pth" element relative to the first "pth" element which is done using the relative receive signals.

Figure 5A:
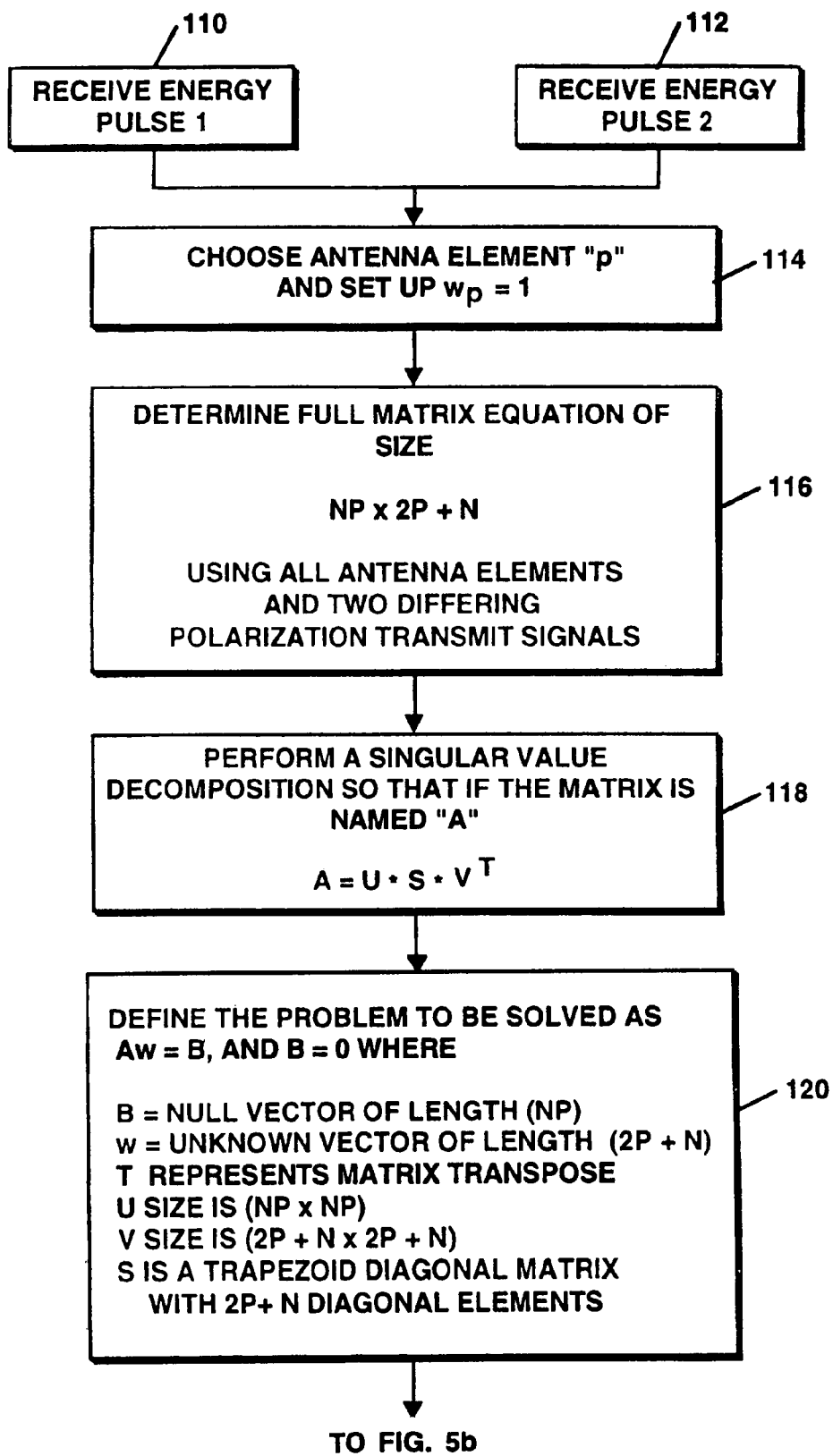
FIG. 5a and FIG. 5b together are a flow chart of a second method for determining calibration constants for all antenna elements at one time using singular value decomposition for a receive only phased array antenna according to the present invention.
Figure 5B:
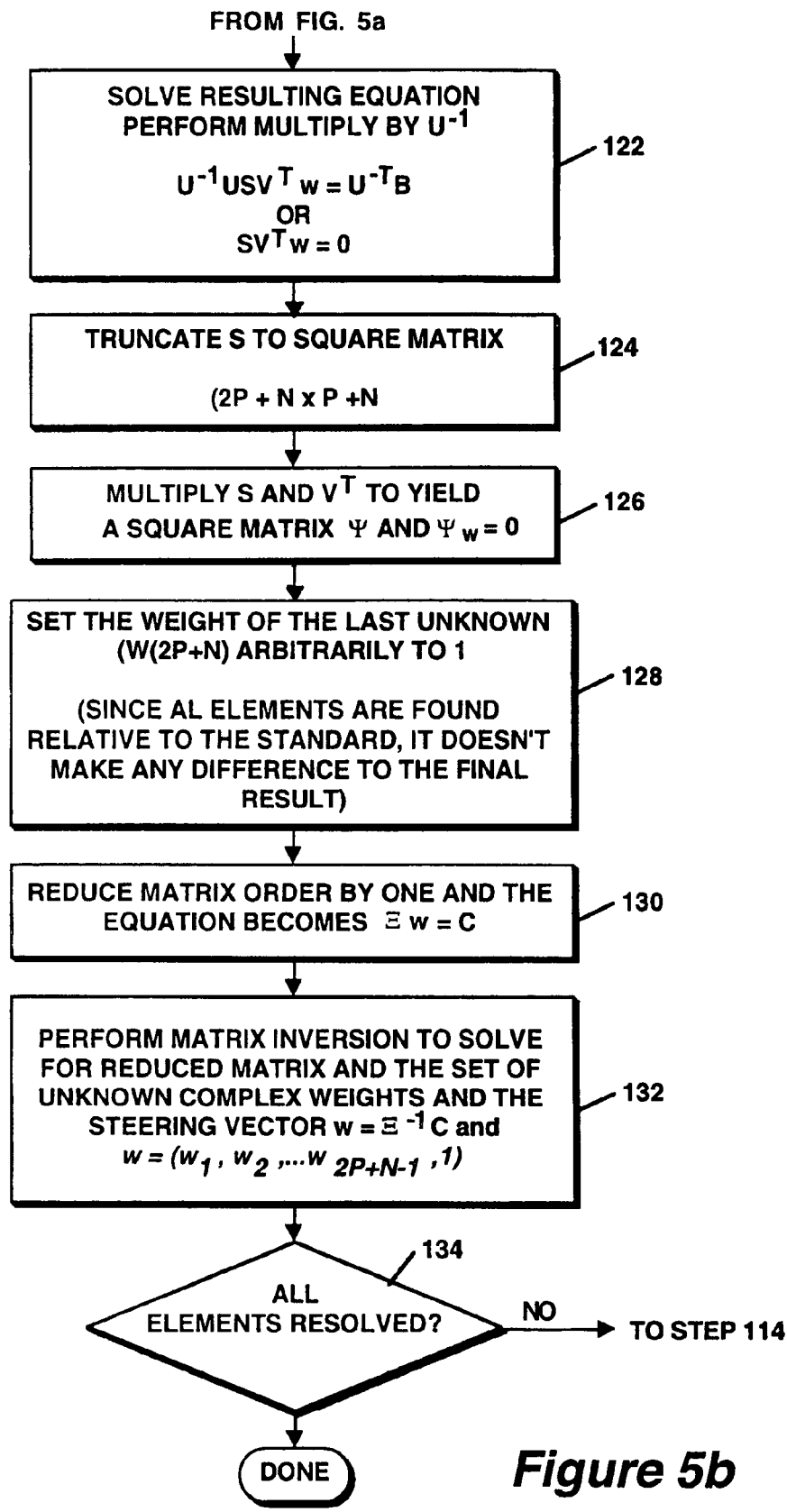

Referring now to FIG. 5a and FIG. 5b together, a second method is shown for determining the calibration constants for all antenna elements of a receive only phased array antenna where the minimization is for the sum of all the weighted receive signals minus the theoretical coherent received energy. In step 110 the receive energy Pulse 1 and Pulse 2 are received by the antenna 12, and in step 114 an antenna element "p" is chosen and $w_p=1$ is set up. A full matrix equation is then determined as shown in step 116 for all elements and two differing polarization transmit signals. This yields a matrix of size (NP×2P+N). (The matrix for a case with 3 elements and 2 calibration pulses is shown above in the first method, FIG. 3).

In step 118, a singular value decomposition is done so that, if the matrix is named "A".

$$A = U*S*V^T,$$

The problem can now be written as in step 120:

$$Aw = B$$

Where:
B is the null vector of length (NP),
w is the unknown vector of length (2P+N).
The T represents matrix transpose,
U and V are unitary matrices; the size of U is (NP×NP); the size of V is (2P+N×2P+N); and
S is a trapezoid diagonal matrix.

S has (2P+N) "diagonal" elements and all rows, where the row number is greater than 2P+N, are zero (step 122).

$$U^{-1}USV^T w = U^{-1}B$$

or $$SV^T w = 0$$

In step 124, S is then truncated, with no loss of information, to be sized to (2P+N×2P+N).

From this point, S and $V^T$ are multiplied together in step 126 to yield a square matrix, Ψ. Therefore, $$\Psi w = 0.$$

One weight can be arbitrarily set without loss of generality. Setting the last unknown, $W_{(2P+N)}=1$ (step 128) allows the reduction of the matrix order by one and the equation becomes (step 130):

$$\Xi w = C$$

where $C = -\Psi_{(1:2P+N-1, \; 2P+N)}$ $\Xi = \Psi_{(1:2P+N-1, \; 1:2P+N-1)}$ $w = w_{(1:2P+N-1)}$ $$\Psi = \begin{bmatrix} \Xi & -C \\ \mu & \Psi_{2P+N,2P+N} \end{bmatrix}$$

Now a standard matrix inversion technique can be used to solve for the remaining unknowns (step 132).

$$w = \Xi^{-1} C$$

and $$w = (w_1, w_2, \ldots w_{2P+N-1}, 1)$$

At this point if all elements are not resolved, then return to step 114; otherwise the calibration constants are determined and the method is completed.

This invention has been disclosed in terms of certain embodiments. It will be apparent that many modifications can be made to the disclosed methods without departing from the invention. Therefore, it is the intent of the appended claims to cover all such variations and modifications as come within the true spirit and scope of this invention.

What is claimed is:

1. A method for determining calibration constants for calibrating a receive only phased array antenna comprising the steps of:
   providing a pair of transmit signals with unknown polarization;
   identifying known parameters including a location ($\vec{x}_n$) of an antenna element (n) of said phased array antenna, an orientation $\Delta \vec{x}_n$ of said antenna element (n) polarization of element (n) relative to the orientation of element (n), and a location of a transmitter $\vec{x}^1$;
   identifying unknown parameters including weights ($w_n$) of the elements (n), and vertical magnitude ($E_v$) and horizontal magnitude ($E_H$) of each of said transmit signals;
   determining a receive signal at each of said antenna elements based on said transmit signals;
   defining six simultaneous equations with seven unknowns using one antenna element as a standard (p), a second antenna element (m, where m≠p) and a third antenna element (n, where n≠p and n≠m);
   solving said six simultaneous equations for weights for every possible set of three antenna elements to find a vector of calibration weight (w) for each antenna element; and
   averaging said calibration weights (w) for each antenna element.

2. The method as recited in claim 1 wherein said method comprises the steps of:
   determining a standard deviation on said calibration weights (w) for each antenna element;
   removing outlier weights; and
   reaveraging said calibration weights (w) for each antenna element.

3. The method as recited in claim 1 wherein said method comprises the step of reducing an original set of antenna elements to a reduced set of unsolved elements and repeating said method.

4. The method as recited in claim 1 wherein said step of identifying known parameters comprises the step of determining the polarization of element n from the combination of said orientation $\Delta \vec{x}_n$ of said antenna element (n) and said polarization of element (n) relative to the orientation of element (n).

5. A method for determining calibration constants for calibrating a receive only phased array antenna comprising the steps of:
   providing a pair of transmit signals with unknown polarization;
   selecting antenna element "p" and setting weight $w_p=1$;
   determining full matrix equation (A) of size NP×2P+N using all antenna elements and said pair of transmit signals with unknown polarization;
   performing a singular value decomposition on said matrix equation (A), wherein $A = U*S*V^T$;
   multiplying matrix equation (A) by $U^{-1}$ and solving resulting equation for B=0 according to the relationship: $U^{-1}USV^T w = U^{-1}B$ or $SV^T w = 0$;
   truncating matrix S to a square matrix of (2P+N×2P+N);
   multiplying S and $V^T$ to yield a square matrix $\Psi$ and $\Psi_w = 0$;
   reducing said square matrix $\Psi$ order by 1 by setting a last unknown, $W_{(2P+N)} = 1$, wherein said equation becomes $\Xi w = C$;
   performing a matrix inversion to solve for reduced matrix and the set of unknown complex weights and a steering vector, wherein $w = \Xi^{-1} C$ and $w = (w_1, w_2, \ldots w_{2P+N-1}, 1)$; and
   repeating the above steps until said calibration constants of all antenna elements p are determined.

6. An apparatus comprising:
   a first transmitter and a second transmitter, each of said first transmitter and said second transmitter transmitting signals of different polarizations;
   a receive only phased array antenna system having a phased array antenna with linearly polarized antenna elements for receiving said transmitted signals of different polarizations from said first transmitter and said second said transmitter; and
   a processor coupled to outputs of said antenna elements for determining calibration constants for each of said antenna elements of said phased array antenna for calibrating said phased array antenna.

7. The apparatus as recited in claim 6 wherein said processor comprises means for determining said calibration constants using combination of said antenna elements and averaging the results for each antenna element.

8. The apparatus as recited in claim 6 wherein said processor comprises means for determining said calibration constants of each of said antenna elements at one time using a singular decomposition resulting in a manipulation of large sparse matrices.

* * * * *